United States Patent
Hassan

(10) Patent No.: US 12,393,965 B2
(45) Date of Patent: *Aug. 19, 2025

(54) SESSION IDENTIFICATION METRICS THROUGH BLOOM FILTERS

(71) Applicant: SAP SE, Walldorf (DE)

(72) Inventor: Ahmad Hassan, Maidenhead (GB)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,179

(22) Filed: Apr. 23, 2024

(65) Prior Publication Data

US 2024/0273577 A1 Aug. 15, 2024

Related U.S. Application Data

(63) Continuation of application No. 16/196,791, filed on Nov. 20, 2018, now Pat. No. 11,995,688.

(51) Int. Cl.
*G06Q 30/0272* (2023.01)
*G06F 3/0482* (2013.01)
*G06Q 30/0242* (2023.01)

(52) U.S. Cl.
CPC ....... *G06Q 30/0272* (2013.01); *G06F 3/0482* (2013.01); *G06Q 30/0242* (2013.01)

(58) Field of Classification Search
None
See application file for complete search history.

(56) References Cited

U.S. PATENT DOCUMENTS

| | | | |
|---|---|---|---|
| 2005/0033803 A1* | 2/2005 | Vleet | G06Q 30/02 707/E17.116 |
| 2008/0071904 A1* | 3/2008 | Schuba | H04L 43/18 709/224 |
| 2010/0161795 A1* | 6/2010 | Deridder | H04L 67/146 709/224 |
| 2020/0160401 A1 | 5/2020 | Hassan | |

OTHER PUBLICATIONS

Wang, Peng et al: "Designing scratchpad memory archictecture with emerging STT RAM memory technologies." 2013 IEEE International SYmposium on Circuits and Systems (Year: 2013).*

(Continued)

*Primary Examiner* — Katherine Kolosowski-Gager
(74) *Attorney, Agent, or Firm* — SCHWEGMAN LUNDBERG & WOESSNER, P.A.

(57) ABSTRACT

In an example embodiment, information about an interaction by a user, via the graphical user interface, with an item rendered in the graphical user interface, is obtained from a graphical user interface. The information includes a session identification corresponding to a networking session in which the interaction occurred and an item identification corresponding to the item interacted with. Then k hash functions are applied to a combination of the session identification and the item identification, producing k indexes. Values of bits corresponding to the k indexes in a bloom filter stored in a non-volatile memory are determined. In response to a determination that the values of bits corresponding to the k indexes are all set to one, a session counter corresponding to the item identification is incremented.

20 Claims, 7 Drawing Sheets

(56) References Cited

OTHER PUBLICATIONS

"U.S. Appl. No. 16/196,791, Advisory Action mailed Oct. 1, 2021", 20 pgs.
"U.S. Appl. No. 16/196,791, Appeal Brief filed Nov. 3, 2021", 17 pgs.
"U.S. Appl. No. 16/196,791, Appeal Decision mailed Oct. 17, 2023", 10 pgs.
"U.S. Appl. No. 16/196,791, Examiner Interview Summary mailed Apr. 1, 2021", 3 pgs.
"U.S. Appl. No. 16/196,791, Examiner Interview Summary mailed Sep. 11, 2020", 3 pgs.
"U.S. Appl. No. 16/196,791, Examiner's Answer to Appeal Brief mailed Mar. 11, 2022", 14 pgs.
"U.S. Appl. No. 16/196,791, Final Office Action mailed Jun. 24, 2021", 11 pgs.
"U.S. Appl. No. 16/196,791, Final Office Action mailed Dec. 18, 2020", 12 pgs.
"U.S. Appl. No. 16/196,791, Non Final Office Action mailed Mar. 4, 2021", 10 pgs.
"U.S. Appl. No. 16/196,791, Non Final Office Action mailed Aug. 21, 2020", 12 pgs.
"U.S. Appl. No. 16/196,791, Notice of Allowance mailed Jan. 23, 2024", 7 pgs.
"U.S. Appl. No. 16/196,791, Response filed Feb. 11, 2021 to Final Office Action mailed Dec. 18, 2020", 10 pgs.
"U.S. Appl. No. 16/196,791, Response filed May 18, 2021 to Non Final Office Action mailed Mar. 4, 2021", 8 pgs.
"U.S. Appl. No. 16/196,791, Response filed Aug. 31, 2021 to Final Office Action mailed Jun. 24, 2021", 8 pgs.
"U.S. Appl. No. 16/196,791, Response filed Sep. 15, 2020 to Non Final Office Action mailed Aug. 21, 2020", 9 pgs.
Wang, Peng, et al., "Designing scratchpad memory architecture with emerging STT-RAM memory technologies", IEEE International Symposium on Circuits and Systems, (2013), 1244-1247.

\* cited by examiner

SESSION IDENTIFICATION METRICS THROUGH BLOOM FILTERS

CROSS-REFERENCE TO RELATED APPLICATIONS

This application is a continuation of prior application Ser. No. 16/196,791, filed on Nov. 20, 2018, which is incorporated by reference herein in its entirety.

TECHNICAL FIELD

This document generally relates to the field of non-volatile computer memories. More specifically, this document relates to the calculation of conversion rate through bloom filters to minimize the amount of date being stored in non-volatile computer memory to improve energy efficiency and memory life.

BACKGROUND

The field of memory storage for computing devices has evolved significantly in the last decade. Traditionally, long-term storage was performed via disk-based storage devices while short-term storage was performed using main memory such as random access memory (RAM). Two major types of RAM are static RAM (SRAM) and dynamic RAM (DRAM). Disk-based storage devices were cheaper in cost for the same amount of memory as RAM, and could continue to store data without external energy sources such as electricity. Two major types of disk-based storage devices are Flash Memory and Hard Disk Drives. In recent years, however, companies have experimented with blurring the lines between RAM and disk-based storage, and between volatile and non-volatile memory.

One way that these lines are being blurred is through the use of what is known as emerging non-volatile memory (emerging NVM). Emerging NVM combines the speed of SRAM, the density of DRAM, and the non-volatility of Flash memory.

While emerging NVMs are generally high density with low leakage, one drawback they encounter is that their dynamic energy usage is high, especially during write operations. An additional drawback of emerging NVMs is that each write that is performed reduces the lifetime of the cell to which the data is being written. The result is that it is beneficial from the energy and cost standpoint to reduce the number of writes performed in an emerging NVM.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a bloom filter is used to count a number of unique sessions within a window of time for a particular graphical user interface item. This allows for session identification matching without storing millions of real session IDs in an emerging NVM cell, thus saving energy and improving NVM cell life. This can be especially useful in microservice based cloud solutions that capture user behavior through different metrics collected from user interactions with online websites or screens in user interfaces in standalone applications.

In conventional approaches, an online website may capture a number of metrics. For example, if the website sells products, the metrics may involve metrics that help drive a set of products that should be promoted by customers on an individual basis. One common metric captured by websites is conversion rate, which, for online sales, is a measure of the number of product orders divided by the number of sessions with page views for the product.

An online website may capture such metrics by capturing user behavior in a graphical user interface. This user behavior capturing may be triggered by an online website sending events to a context driven services component through a profile edge service. From the profile edge service, the events are routed to an event queue for consumption by a cloud merchandising component.

Some of these metrics, however, such as conversion rate, involve the identification of the number of unique sessions corresponding to a graphical user interface item, which has a product identification (e.g., SKU). In the conventional approach, the number of session identifications are stored against each product identification in order to count the number of unique sessions across all the tenants for each product identification. This causes, however, significant performance and space overhead. If the metric collection window holds the sessions data for 24 hours or 7 days, then there can be millions of sessions during that window. Storing that amount of session data necessitates significant overhead for the applications running in the cloud.

Figure 1:
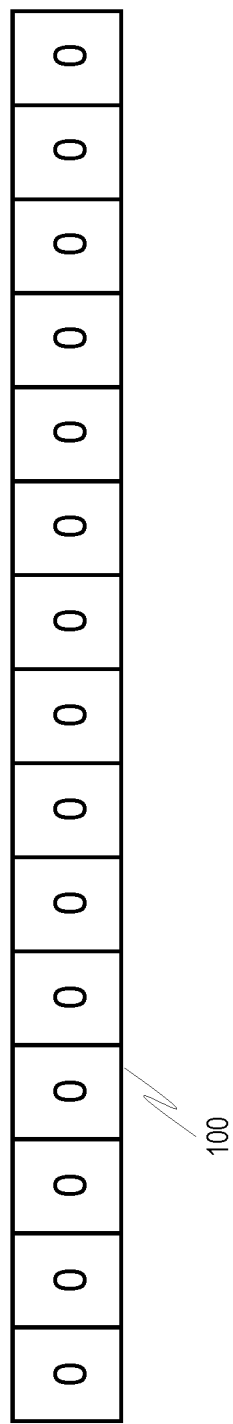
FIG. 1 is a diagram illustrating an example of an empty bloom filter 100, in accordance with an example embodiment.

In an example embodiment, a bloom filter is used to count the number of unique sessions within each window for each item. Bloom filters are probabilistic data structures to find a given key within a set with a zero false negative rate. At its essence, a bloom filter is an array of m bits. Queries to the bloom filter return either "possibly in set" or "definitely not in set." In an empty bloom filter 100, all of the bits are set to zero. FIG. 1 is a diagram illustrating an example of an empty bloom filter 100 in accordance with an example embodiment. As can be seen in this figure, all bits of the empty bloom filter 100 are set to zero.

Figure 2:
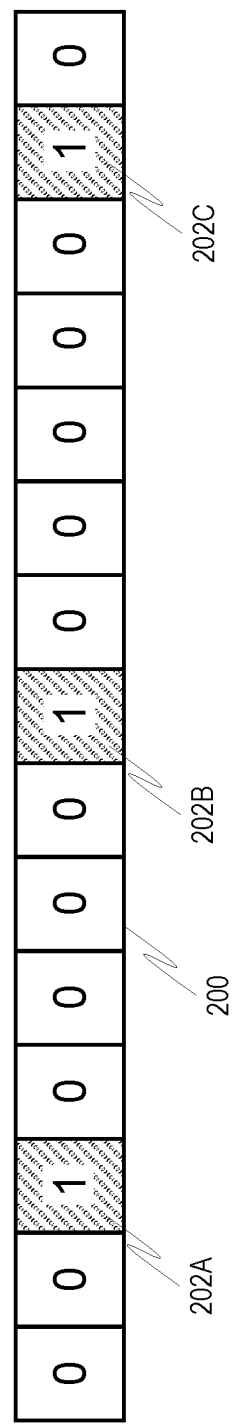
FIG. 2 is a diagram illustrating an example of a bloom filter with three bits activated, in accordance with an example embodiment.

To add the session identification into the bloom filter, a set of k hash functions may be applied to the session identification to produce index values to set within the bloom filter. FIG. 2 is a diagram illustrating an example of a bloom filter 200 with three bits activated, in accordance with an example embodiment. Here, k hash functions have turned on bits 202A, 202B, and 202C in the bloom filter 200. If the same session identification comes in again, then it will be matched against the same bits that were turned on previously, and the session identification will be found to have a match in the bloom filter 200.

With bloom filter style key matching, false positives are possible but false negatives are not. False positives can be kept under one percent by choosing the number of applied hash functions and the number of bits within the bloom filter 200. For example, 10 bits per item may be used. In an example embodiment, k is a constant that is much smaller than the number of bits in the bloom filter 200, which is proportional to the number of potential items being added. To add an item identification, the item identification is fed to each of the k hash functions to get k array positions. These positions are set to 1. To query for an item identification, the item identification is fed to the k hash functions to obtain k array positions. If any of the bits at these positions is 0, then the item identification is definitely not in the set. If all are set to 1, then either the item identification has already been stored in the bloom counter, or the bits have been set by chance to 1 during the insertion of other item identifications (false positive).

Figure 3:
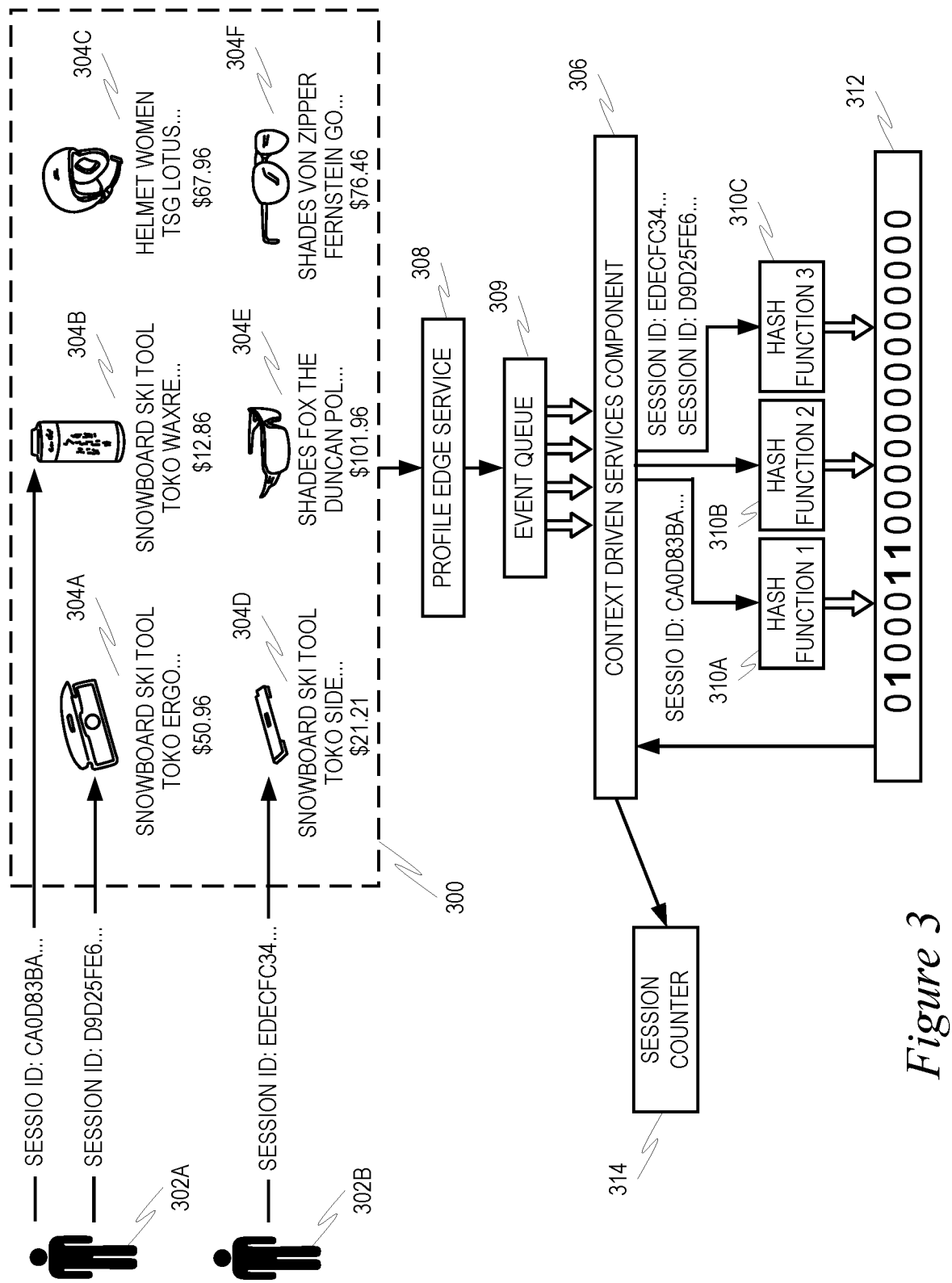
FIG. 3 is a diagram of the application of bloom filters for use in matching session views of items in a graphical user interface, in accordance with an example embodiment.

FIG. 3 is a diagram of the application of bloom filters 200 for use in matching session views of items in a graphical user interface, in accordance with an example embodiment.

An online website may provide the graphical user interface 300, such as a web page rendered in a web browser or a screen of a stand-alone application (such as an "app" running on a mobile device). Users 302A, 302B are able to interact with items 304A-304F rendered in the graphical user interface 300. There are many different ways for a user 302A, 302B to interact with items 304A-304F in the graphical user interface 300, but for purposes of the present disclosure the two main ways are to view an item 304A-304F (which typically will result in another web page being rendered that is dedicated to the selected item) or to purchase an item 304A-304F. When an interaction occurs, this interaction is passed to a context driven services component 306 via profile edge service 308, which places information about each interaction in an event queue 309. Specifically, a session identification and an item identification corresponding to the interaction are stored in the event queue 309. Each time an interaction occurs, the context driven services component 306 may then run a combination of the session identification associated with the interaction and the item identification corresponding to the interaction through k hash functions 310A-310C, which produces a series of indexes to the bloom filter 312. These indexes may then be used to check the corresponding bits in the bloom filter 312. If at least one of these corresponding bits are zero, then all of these corresponding bits are set to one. If all of the corresponding bits, however, are one, then a session counter 314 corresponding to the item identification may be incremented.

There will be one bloom filter 312 for each window of time to be measured, and a session counter 314 for each item identification whose interactions are to be measured. Once the window of time passes, the bloom filter 312 and the sessions counters 314 may be cleared.

Later, the context driven services component 306 can access the session counters 314 to generate metrics.

Thus, when a new session identification/item identification comes in, the same hash functions 310A-C are applied to the given session identification and item identification and matched against the bloom filter 312. The bloom filter 312 returns true if the match is found otherwise it returns false. This way, without storing millions of real session identifications, the system is still able to find which session identifications have been seen against each product SKU per tenant.

The bloom filter 312 may then be used in an algorithm that calculates a desired metric. For example, in the case if a conversion rate metric for products, the algorithm may be as follows:

---

Let
S1, S2, S3... .. Sn be the set of Session ID during time window t1 and t2
Customer C1 initiates Session S1 and buys product P1 and P2.
Customer C1 initiates Session S2 and buys product P1.
Customer C1 initiates Session S3 and buys product P2.
The product events are captured and session IDs S1, S2 and S3 are applied with 'k' number of hash functions.
We choose a set of 3 hash functions and pass each session ID and product ID to all three hash function (which are represented by the aggregate Hash_function.
HashS1 = Hash_function(S1, P1) + Hash_function(S1, P2)
HashS2 = Hash_function(S2, P1)
HashS3 = Hash_function(S3, P3)
Let BF represents the Bloom Filter which has been initialized with 0 for all the 'm' bits in the global intiializer.
For incoming product event 'P' and Session ID 'S'
If (match(Hash, BF) == FALSE)
Set(Hash, BF)
Increment_Session_Count(P)
Conversion Metric = Number of Product Orders/Session_Count

---

To provide further context, various types of NVM are described in further detail. Example types of NVM include phase-change memory (PCM), spin-transfer torque RAM (STT-RAM) and Registive RAM (RRAM). In some examples, NVM memory chips are byte-addressable, non-volatile, require near-zero leakage power, and have density and latency closer to current DRAM technology. Unlike DRAM, however, NVM includes asymmetric read, write, and erase latencies.

In general, PCM exploits the properties of chalcogenide glass when heated and cooled at different speeds. The latency and dynamic energy of PCM, however, are worse than those of other technologies. In comparison to DRAM, for example, PCM is approximately 2× slower for array read and approximately 43× slower for array write, while leakage power is approximately 1% of DRAM. In general, STT RAM is a magnetic RAM device that stores data using the orientation of a magnetic field. In some examples, STT RAM has lower latency than PCM. The dynamic energy and density of STT-RAM is worse than DRAM. STT-RAM, however, has better endurance (e.g., 1015 cycles) as compared to other NVM technologies. In general, RRAM uses measurable change in resistance resulting from the movement of ions to represent 0 or 1. RRAM devices based on memristors are a promising NVM technology for the realization of faster, high density, non-volatile and low power main memory.

Figure 4:
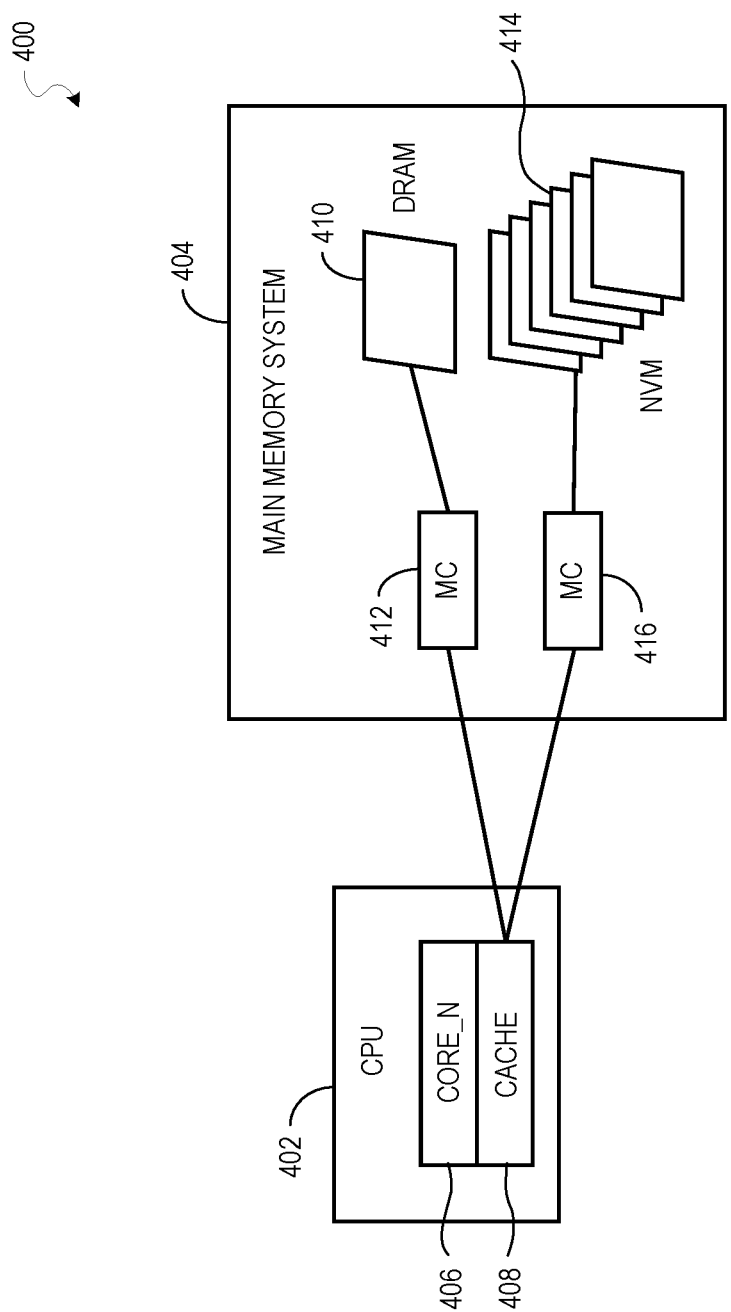
FIG. 4 depicts an example memory architecture that can be implemented within an enterprise server.

FIG. 4 depicts an example memory architecture 400 that can be implemented within an enterprise server. In the example of FIG. 4, the example memory architecture 400 includes a central processing unit (CPU) 402 and a main memory system 404. The CPU 402 includes a core 406 having a respective cache 408. Although a single core 406 and respective cache 408 is depicted, it is appreciated that the CPU 402 can include multiple cores 406, each with a respective cache 408. Further, although a single CPU 402 is depicted, it is appreciated that enterprise servers can include multiple CPUs 402. The main memory system 404 optionally includes DRAM 410 with a respective memory controller (MC) 412, and NVM 414 with a respective MC 416. In some examples, the cache 408 accesses (e.g., read, write, delete) the DRAM 410 through the MC 412, and accesses (e.g., read, write, delete) the NVM 414 through the MC 416.

In some examples, the example memory architecture 400 can be implemented in an in-memory database system. An in-memory database system is a database management system that uses main memory for data storage. In some examples, main memory includes random access memory (RAM) that communicates with one or more processors, e.g., central processing units (CPU 402s), over a memory bus. An in-memory database system can be contrasted with database management systems that employ a disk storage mechanism. In some examples, in-memory database systems are faster than disk storage databases, because internal optimization algorithms can be simpler and execute fewer CPU instructions. In some examples, accessing data in an in-memory database system eliminates seek time when querying the data, which provides faster and more predictable performance than disk-storage databases. In some examples, an in-memory database can be provided as a column-oriented in-memory database, in which data tables are stored as sections of columns of data (rather than as rows of data). An example in-memory database system includes HANA, provided by SAP SE of Walldorf, Germany.

The presence of both NVM 414 and DRAM 410 in the example memory architecture 400 permits the possibility of utilizing both together as a hybrid in-memory database system. For purposes of the present disclosure, however, the focus will be on write operations that are traditionally performed in NVM 414 and whose elimination would result in significant energy savings and lengthen the life of the NVM 414.

Figure 5:
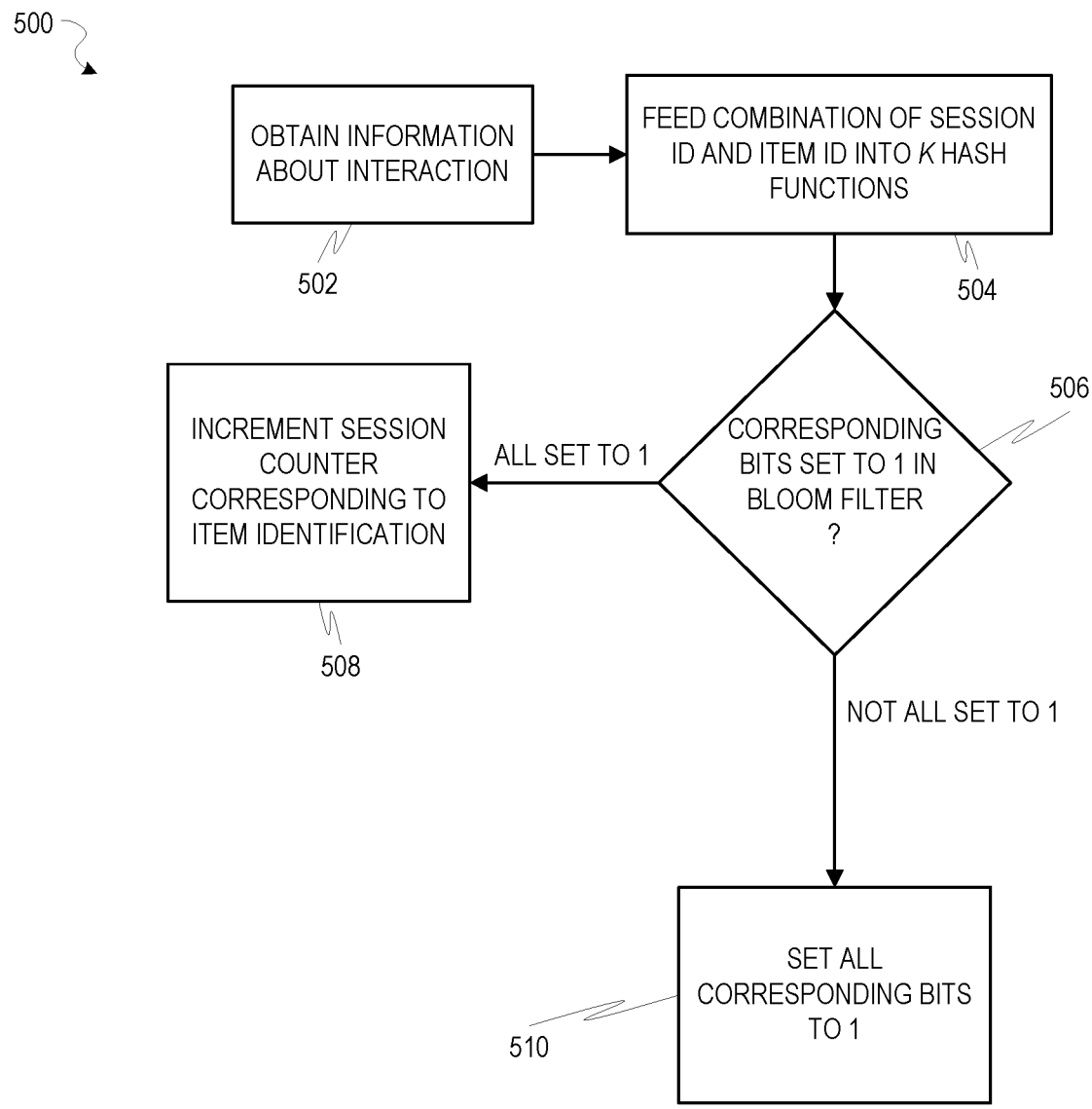
FIG. 5 is a flow diagram illustrating a method, in accordance with an example embodiment.

FIG. 5 is a flow diagram illustrating a method 500, in accordance with an example embodiment. At operation 502, information about an interaction by a user 302A, B, via a graphical user interface 300, with an item rendered in the graphical user interface 300, is obtained from the graphical user interface 300. The information includes a session identification corresponding to a networking session in which the interaction occurred and an item identification corresponding to the item interacted with. At operation 504, k hash functions are applied to a combination of the session identification and the item identification, producing k indexes. At operation 506, values of bits corresponding to the k indexes in a bloom filter 200 stored in an NVM are determined. If all of these bits are set to one, then at operation 508, a session counter 314 corresponding to the item identification is incremented. If not all of these bits are set to one, then at operation 510 all of the bits are set to one.

It should be noted that the above description is framed in terms of the use of session identification counters to aid in calculation of product conversion rates. Other embodiments, however, are envisioned in which the session identification counters are used in any sort of metric. Indeed, any metric that involves counting the number of interactions with a rendered web site item can benefit from the disclosure herein. This allows all sorts of metrics to utilize this technique and further reduces the energy consumption of the corresponding NVMs in which information pertaining to session identifications would ordinarily have been stored, as well as increasing the life of such NVMs.

EXAMPLES

Example 1. A system comprising:
 at least one hardware processor;
 a non-volatile memory (NVM); and
 a computer-readable medium storing instructions that, when executed by the at least one hardware processor, cause the at least one hardware processor to perform operations comprising:
  obtaining, from a graphical user interface, information about an interaction by a user via the graphical user interface, with an item rendered in the graphical user interface, the information including a session identification corresponding to a networking session in which the interaction occurred and an item identification corresponding to the item interacted with;
  applying k hash functions to a combination of the session identification and the item identification, producing k indexes;
  determining values of bits corresponding to the k indexes in a bloom filter stored in the NVM; and
  in response to a determination that the values of bits corresponding to the k indexes are all set to one, incrementing a session counter corresponding to the item identification.

Example 2. The system of Example 1, wherein the operations further comprise, in response to a determination that the values of bits corresponding to the k indexes are not all set to one, setting all the values of the bits corresponding to the k indexes to one.

Example 3. The system of Examples 1 or 2, wherein the operations further comprise:
 calculating a metric for the item using a value in the session counter corresponding to the item identification.

Example 4. The system of any of Examples 1-3, wherein the item is a product.

Example 5. The system of any of Examples 1-4, wherein the interaction is a view of the item.

Example 6. The system of any of Examples 1-5, wherein the NVM is phase-change memory.

Example 7. The system of any of Examples 1-6, wherein the NVM is spin-transfer torque random access memory.

Example 8. A method comprising:
 obtaining, from a graphical user interface, information about an interaction by a user via the graphical user interface, with an item rendered in the graphical user interface, the information including a session identification corresponding to a networking session in which the interaction occurred and an item identification corresponding to the item interacted with;
 applying k hash functions to a combination of the session identification and the item identification, producing k indexes;
 determining values of bits corresponding to the k indexes in a bloom filter stored in an NVM; and
 in response to a determination that the values of bits corresponding to the k indexes are all set to one, incrementing a session counter corresponding to the item identification.

Example 9. The method of Example 8, wherein the operations further comprise, in response to a determination that the values of bits corresponding to the k indexes are not all set to one, setting all the values of the bits corresponding to the k indexes to one.

Example 10. The method of Examples 8 or 9, wherein the operations further comprise:
   calculating a metric for the item using a value in the session counter corresponding to the item identification.

Example 11. The method of any of Examples 8-10, wherein the item is a product.

Example 12. The method of any of Examples 8-11, wherein the interaction is a view of the item.

Example 13. The method of any of Examples 8-12, wherein the NVM is phase-change memory.

Example 14. The method of any of Examples 8-13, wherein the NVM is spin-transfer torque random access memory.

Example 15. A non-transitory machine-readable medium storing instructions which, when executed by one or more processors, cause the one or more processors to perform operations comprising:
   obtaining, from a graphical user interface, information about an interaction by a user via the graphical user interface, with an item rendered in the graphical user interface, the information including a session identification corresponding to a networking session in which the interaction occurred and an item identification corresponding to the item interacted with;
   applying k hash functions to a combination of the session identification and the item identification, producing k indexes;
   determining values of bits corresponding to the k indexes in a bloom filter stored in an NVM; and
   in response to a determination that the values of bits corresponding to the k indexes are all set to one, incrementing a session counter corresponding to the item identification.

Example 16. The non-transitory machine-readable medium of Example 15, wherein the operations further comprise, in response to a determination that the values of bits corresponding to the k indexes are not all set to one, setting all the values of the bits corresponding to the k indexes to one.

Example 17. The non-transitory machine-readable medium of Examples 15 or 16, wherein the operations further comprise:
   calculating a metric for the item using a value in the session counter corresponding to the item identification.

Example 18. The non-transitory machine-readable medium of any of Examples 15-17, wherein the item is a product.

Example 19. The non-transitory machine-readable medium of any of Examples 15-18, wherein the interaction is a view of the item.

Example 20. The non-transitory machine-readable medium of any of Examples 15-19, wherein the NVM is phase-change memory.

Figure 6:
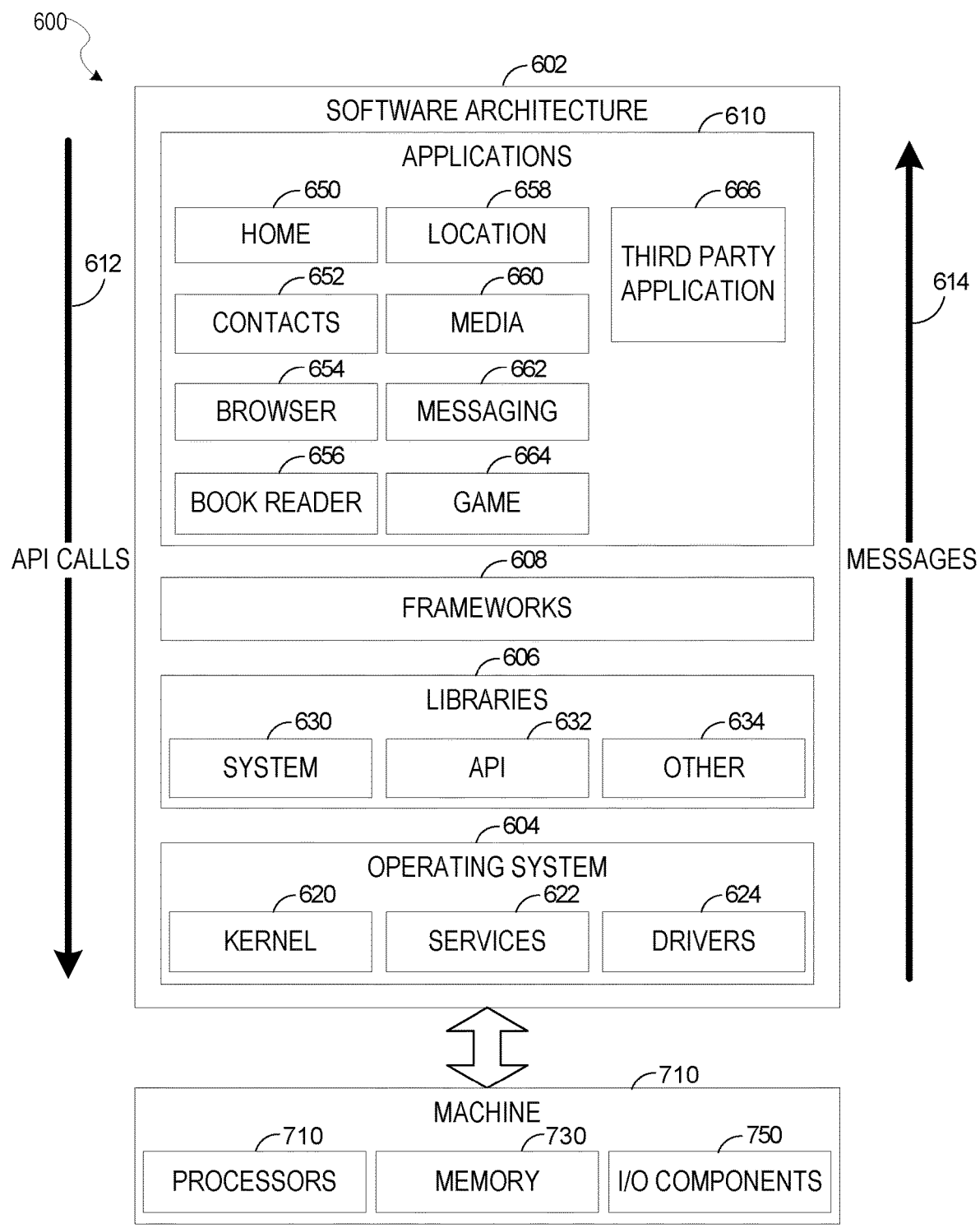
FIG. 6 is a block diagram illustrating an architecture of software, which can be installed on any one or more of the devices described above.

FIG. 6 is a block diagram 600 illustrating an architecture of software 602, which can be installed on any one or more of the devices described above. FIG. 6 is merely a non-limiting example of a software architecture, and it will be appreciated that many other architectures can be implemented to facilitate the functionality described herein. In various embodiments, the software 602 is implemented by hardware such as a machine 700 of FIG. 7 that includes processors 710, memory 730, and input/output (I/O) components 750. In this example architecture, the software 602 can be conceptualized as a stack of layers where each layer may provide a particular functionality. For example, the software 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) 300 functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
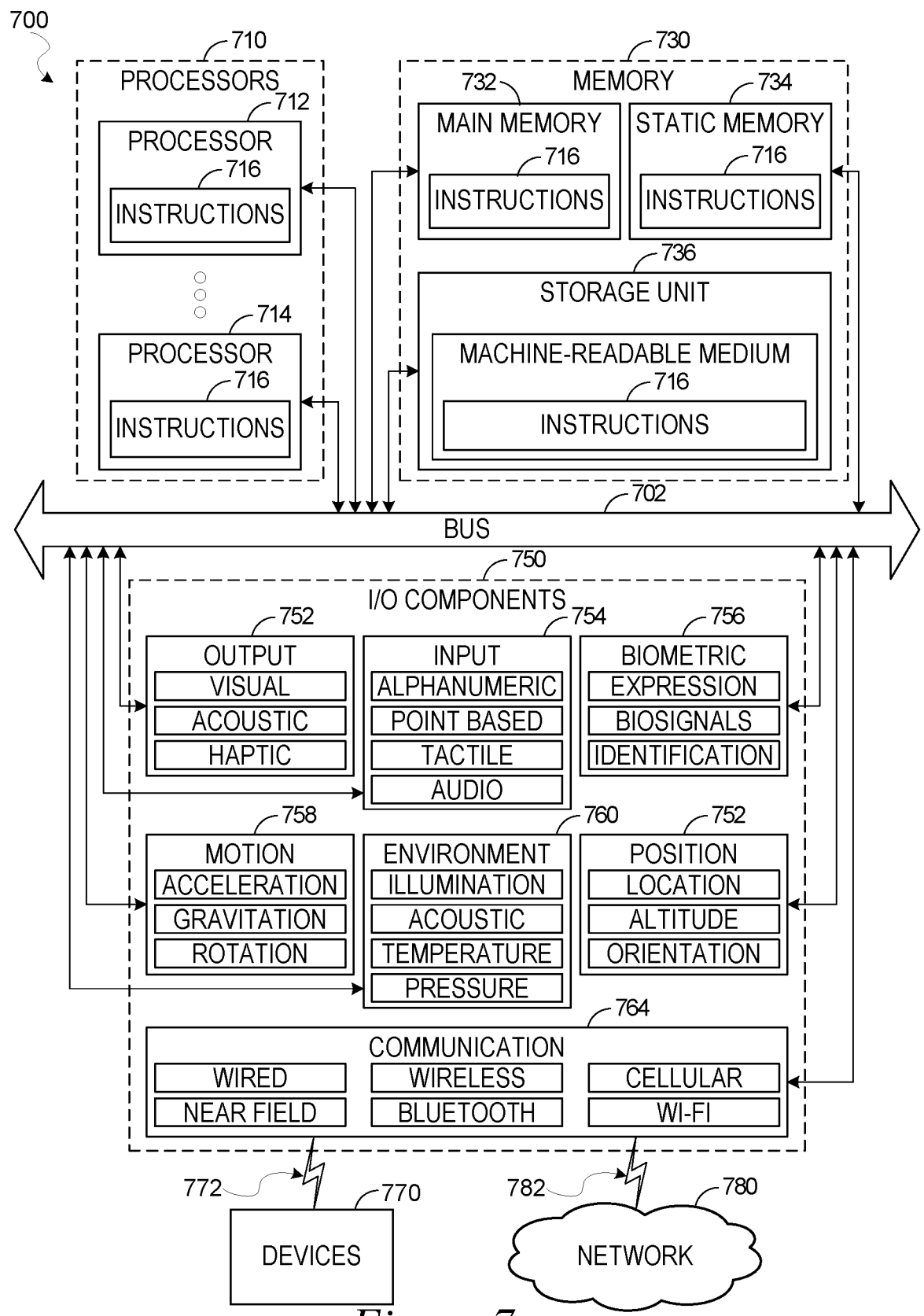
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU 402), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores 406") that may execute instructions 716 contemporaneously. Although FIG. 7 shows multiple processors 710, the machine 700 may include a single processor 712 with a single core 406, a single processor 712 with multiple cores 406 (e.g., a multi-core processor 712), multiple processors 712, 714 with a single core 406, multiple processors 712, 714 with multiple cores 406, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716, embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 770, or position components 752, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 752 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor;
a memory having a property that each write to a cell of the memory reduces lifetime of the cell; and
a computer-readable medium storing instructions that, when executed by the at least one hardware processor, cause the at least one hardware processor to perform operations comprising:
obtaining, a session identification having a property of uniquely identifying a first networking session during which an item was accessed, in contrast to a second concurrent networking session, and an item identification corresponding to the item, wherein a networking session is a set of activities occurring during a single connection between two network devices;
applying k hash functions to a combination of the session identification and the item identification, to produce k indexes;
determining values of bits corresponding to the k indexes in a bloom filter stored in the memory without storing information about the accessing of the item in the memory, thereby preserving lifespan of at least one cell of the memory; and
in response to a determination that the values of bits corresponding to the k indexes are all set to one, incrementing a session counter corresponding to the item identification.

2. The system of claim 1, wherein the operations further comprise, in response to a determination that the values of bits corresponding to the k indexes are not all set to one, setting all the values of the bits corresponding to the k indexes to one.

3. The system of claim 1, wherein the operations further comprise:
calculating a metric for the item using a value in the session counter corresponding to the item identification.

4. The system of claim 1, wherein the item is a physical product.

5. The system of claim 1, wherein the session identification is associated with a view of the item.

6. The system of claim 1, wherein the memory is phase-change memory.

7. The system of claim 1, wherein the memory is spin-transfer torque random access memory.

8. A method comprising:
obtaining, a session identification having a property of uniquely identifying a first networking session during which an item was accessed, in contrast to a second concurrent networking session, and an item identification corresponding to the item, wherein a networking session is a set of activities occurring during a single connection between two network devices;
applying k hash functions to a combination of the session identification and the item identification, to produce k indexes;
determining values of bits corresponding to the k indexes in a bloom filter stored in a memory without storing information about the accessing of the item in the memory, the memory having a property that each write to a cell of the memory reduces lifetime of the cell, thereby preserving lifespan of at least one cell of the memory; and
in response to a determination that the values of bits corresponding to the k indexes are all set to one, incrementing a session counter corresponding to the item identification.

9. The method of claim 8, further comprising, in response to a determination that the values of bits corresponding to the k indexes are not all set to one, setting all the values of the bits corresponding to the k indexes to one.

10. The method of claim 8, further comprising:
calculating a metric for the item using a value in the session counter corresponding to the item identification.

11. The method of claim 8, wherein the item is a physical product.

12. The method of claim 8, wherein the session identification is associated with a view of the item.

13. The method of claim 8, wherein the memory is phase-change memory.

14. The method of claim 8, wherein the memory is spin-transfer torque random access memory.

15. A non-transitory machine-readable medium storing instructions which, when executed by one or more processors, cause the one or more processors to perform operations comprising:
obtaining, a session identification having a property of uniquely identifying a first networking session during which an item was accessed, in contrast to a second concurrent networking session, and an item identification corresponding to the item, wherein a networking session is a set of activities occurring during a single connection between two network devices;
applying k hash functions to a combination of the session identification and the item identification, to produce k indexes;
determining values of bits corresponding to the k indexes in a bloom filter stored in a memory without storing information about the accessing of the item in the memory, the memory having a property that each write to a cell of the memory reduces lifetime of the cell, thereby preserving lifespan of at least one cell of the memory; and
in response to a determination that the values of bits corresponding to the k indexes are all set to one, incrementing a session counter corresponding to the item identification.

16. The non-transitory machine-readable medium of claim 15, wherein the operations further comprise, in response to a determination that the values of bits corresponding to the k indexes are not all set to one, setting all the values of the bits corresponding to the k indexes to one.

17. The non-transitory machine-readable medium of claim 15, wherein the operations further comprise:
calculating a metric for the item using a value in the session counter corresponding to the item identification.

18. The non-transitory machine-readable medium of claim 15, wherein the item is a physical product.

19. The non-transitory machine-readable medium of claim 15, wherein the session identification is associated with a view of the item.

20. The non-transitory machine-readable medium of claim 15, wherein the session identification is associated with a phase-change memory.

* * * * *